(12) United States Patent
Réznar et al.

(10) Patent No.: US 8,875,357 B2
(45) Date of Patent: Nov. 4, 2014

(54) CLIP

(75) Inventors: Jason Réznar, Redford, MI (US); Robert Donglas Dziadula, Northville, MI (US); Lawrence Michael Manzo, Troy, MI (US)

(73) Assignee: Tinnerman Palnut Engineered Products, Inc., Brunswick, OH (US)

( * ) Notice: Subject to any disclaimer, the term of this patent is extended or adjusted under 35 U.S.C. 154(b) by 291 days.

(21) Appl. No.: 12/500,380

(22) Filed: Jul. 9, 2009

(65) Prior Publication Data

US 2010/0146747 A1  Jun. 17, 2010

Related U.S. Application Data (60) Provisional application No. 61/134,347, filed on Jul. 9, 2008.

(51) Int. Cl.
| | | |
|---|---|---|
| *A44B 17/00* | (2006.01) | |
| *F16B 2/22* | (2006.01) | |
| *F16B 5/12* | (2006.01) | |
| *F16B 5/06* | (2006.01) | |
| *F16B 21/02* | (2006.01) | |
| *B60J 3/02* | (2006.01) | |

(52) U.S. Cl.
CPC .............. *F16B 5/0657* (2013.01); *F16B 5/125* (2013.01); *F16B 21/02* (2013.01); *F16B 5/065* (2013.01); *B60J 3/0217* (2013.01); *F16B 2005/0671* (2013.01)
USPC .................................. 24/458; 24/289; 24/453

(58) Field of Classification Search
USPC .............. 24/457, 458, 573.09, 580.1, 580.11, 24/581.11, 289–297, 663, 90.1, 109, 110, 24/453, 379.1, 305, 342.1, 578.11, 24/DIG. 31, DIG. 35; 296/1.08, 37.7, 39.1, 296/97.12, 97.13, 97.9; 411/173; 248/289.11, 224.8, 231.9
See application file for complete search history.

(56) References Cited

U.S. PATENT DOCUMENTS

| | | | | |
|---|---|---|---|---|
| 4,630,338 | A | * | 12/1986 | Osterland et al. ................ 24/293 |
| 4,697,774 | A | | 10/1987 | Sarton et al. |
| 5,186,517 | A | * | 2/1993 | Gilmore et al. ................ 296/214 |
| 5,517,731 | A | * | 5/1996 | Spykerman ...................... 24/295 |
| 5,533,237 | A | * | 7/1996 | Higgins .......................... 24/289 |
| 5,677,829 | A | * | 10/1997 | Clemens ........................ 361/697 |

(Continued)

OTHER PUBLICATIONS

International Search Report and Written Opinion; Sep. 16, 2006; Tinnerman Palnut Engineered Products, Inc.

*Primary Examiner* — Robert J Sandy
*Assistant Examiner* — Abigail Morrell
(74) *Attorney, Agent, or Firm* — McDonald Hopkins LLC (57) ABSTRACT

A clip and a method for using the clip is shown and described herein. The clip may include a base, a pair of flaps, a pair of arms and at least one wing. The pair of flaps may be mutually confronting and extend outwardly from the base, wherein each flap includes a tab. The pair of arms may be mutually confronting and extend outwardly from the base, wherein each arm includes a tab. The method may utilize a clip to secure a first component to a second component. The method may include rotating the clip or the first component in a first direction thereby securing each other together. The second component may be placed onto the clip. The first component and clip may be serviceable by rotating the first component in a second direction opposite that of the first to remove the first component from the clip.

15 Claims, 7 Drawing Sheets

(56) References Cited

U.S. PATENT DOCUMENTS

| | | | | |
|---|---|---|---|---|
| 5,722,124 A | * | 3/1998 | Wisniewski | 24/295 |
| 5,917,701 A | * | 6/1999 | Solberg | 361/704 |
| 5,919,019 A | * | 7/1999 | Fischer | 411/182 |
| 6,021,986 A | * | 2/2000 | Murdock | 248/289.11 |
| 6,141,837 A | | 11/2000 | Wisniewski | |
| 6,453,522 B1 | | 9/2002 | Romero Magarino et al. | |
| 6,606,766 B2 | * | 8/2003 | Ko | 24/295 |
| 6,629,717 B1 | * | 10/2003 | Wilson | 296/97.9 |
| 6,692,059 B1 | | 2/2004 | Mills | |
| 6,976,292 B2 | * | 12/2005 | MacPherson et al. | 24/293 |
| 7,086,125 B2 | * | 8/2006 | Slobodecki et al. | 24/295 |
| 7,168,138 B2 | * | 1/2007 | Lubera et al. | 24/295 |
| 7,318,256 B2 | * | 1/2008 | Lubera et al. | 24/295 |
| D576,481 S | * | 9/2008 | Kato et al. | D8/397 |
| 7,496,993 B2 | * | 3/2009 | Kosidlo et al. | 24/295 |
| 7,640,635 B2 | * | 1/2010 | Kim et al. | 24/295 |
| 7,661,632 B2 | * | 2/2010 | Caveney et al. | 248/74.2 |
| 7,753,402 B2 | * | 7/2010 | Volkmann et al. | 280/728.2 |
| 2001/0025404 A1 | * | 10/2001 | Wright | 24/662 |
| 2001/0032377 A1 | * | 10/2001 | Lubera et al. | 24/293 |
| 2001/0046426 A1 | * | 11/2001 | Lubera et al. | 411/182 |
| 2004/0040124 A1 | * | 3/2004 | Lubera et al. | 24/293 |
| 2004/0049894 A1 | * | 3/2004 | Jackson et al. | 24/293 |
| 2005/0116485 A1 | * | 6/2005 | Kuroda | 296/1.08 |
| 2005/0271492 A1 | * | 12/2005 | Jackson et al. | 411/112 |
| 2006/0048348 A1 | * | 3/2006 | Kao | 24/457 |
| 2006/0168773 A1 | * | 8/2006 | Smith et al. | 24/295 |
| 2007/0011853 A1 | | 1/2007 | Smith | |
| 2007/0257158 A1 | * | 11/2007 | Caveney et al. | 248/72 |

* cited by examiner

CLIP

CROSS-REFERENCE TO RELATED APPLICATION

This application claims benefit from U.S. Provisional Patent Application No. 61/134,347, entitled "Clip and Method For Using the Clip," filed on Jul. 9, 2008, which is hereby incorporated in its entirety by reference.

FIELD OF THE INVENTION

The present invention is generally related to an apparatus for securing one or more components together, and more particularly to a clip attachable to one or more components.

BACKGROUND

Typically, fasteners, such as trim clips, may be utilized for securing various components together. During installation of many products, it is necessary to secure two or more components together. Many difficulties are encountered during manufacture and assembly of components. For example, the various components of the products may require different tools in order to assemble the components. As a result, use of numerous and different tools is time consuming and costly for manufacturers.

In addition, the installation of some components is difficult due to limited access, such as access on only one side of the components. Furthermore, it is frequently desirable to permit consumers or others to access a fastener that secures the components, to, for example, repair the components, repair the fastener, exchange the components, clean the components, or for other reasons.

In order to improve efficiency during manufacture, improved fastening devices are needed. The attachment of sun visors in automobiles is one example of a specific application in which an improved fastener is needed. Each of the sun visors typically has a stem portion that secures to a body portion of the sun visor or sun visor bezel. Fasteners have been used to attach the visor portion to the step portion; however, these fasteners are difficult to install and service. Prior fasteners for the sun visor require tooling and result in a practically non-serviceable assembly.

Therefore, there is a need in the art to provide a serviceable clip device that may be attachable to a component without the use of a tool. There is also a need for a clip device that can be used in numerous applications and may be quickly installed to reduce both manufacturing time and expense.

DESCRIPTION OF THE DRAWINGS

Objects and advantages together with the operation of the invention may be better understood by reference to the following detailed description taken in connection with the following illustrations, wherein like numerals indicate like elements throughout, and wherein.

SUMMARY OF INVENTION

The present invention is directed to a clip and method for using the clip. An embodiment of the present invention includes a clip for connecting a first component having a stem and a second component. The clip may include a base, a pair of flaps, a pair of arms and at least one wing. The base may include a planar configuration, wherein the base may include an aperture that may be sized to receive the stem. The pair of flaps may be mutually confronting and may extend outwardly from the base, wherein each flap may include a tab extending at an angle from the flap, and wherein the flap may be capable of engagement with the first component. The pair of arms may be mutually confronting and may extend outwardly from the base, wherein each arm may comprise a tab extending at an angle from the arm, and wherein the tabs of the arms may be capable of engaging the arm with the second component. The wing may extend outwardly from the base.

Another embodiment of the present invention includes a method for using a clip. The method may secure a first component having a stem to a second component. The method may include the steps of placing a clip onto the first component. The clip may comprise a base including an aperture sized to receive the stem, at least one flap including a tab, at least one arm including a tab, and at least one wing. The clip or the first component may be rotated in a first direction thereby securing each other together. The second component may be placed onto the clip. The second component may be secured between the tabs and the first component. In addition, the first component and clip may be serviceable by rotating the first component in a second direction opposite that of the first to remove the first component from the clip.

DETAILED DESCRIPTION

While the present clip may be described in reference to illustrative embodiments described herein, it should be clear that the present invention should not be limited to such embodiments. Therefore, the description of the embodiments provided herein are illustrative of the present invention and should not limit the scope of the invention as claimed.

Moreover, while the present clip may be described in the context of a trim clip, it will be appreciated that the clip may be used in a variety of contexts. In addition, the description of the embodiment provided may refer to a specific orientation of the clip, such as in a particular direction, however, this should not limit the scope of the invention as claimed. Those skilled in the art will understand that the clip may be positioned or attached to any number of surfaces and placed in any number of various orientations and directions and the following descriptions should only be taken as illustrative.

Figure 1:
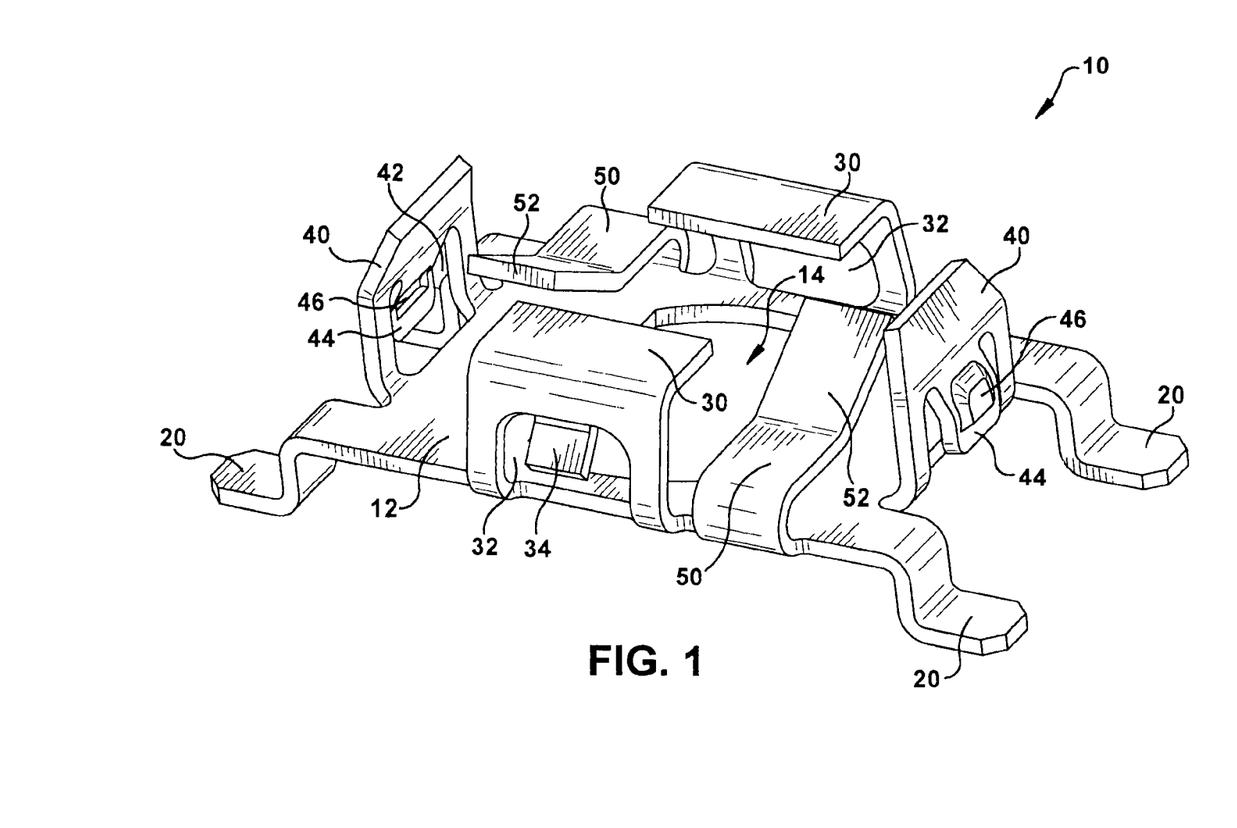
FIG. 1 illustrates a perspective view of a clip in an embodiment of the present invention.

With reference to FIG. 1, an embodiment of a clip 10 is shown. The clip 10 may be any appropriate type of clip, such as a trim clip. The clip 10 may also be of any appropriate shape, size or thickness and should not be limited to that shown and described herein. The clip 10 may be constructed from any appropriate, suitable, or durable material capable of being secured to a component, including, but not limited to, metal, polymer, plastic, composite, fiberglass, and/or the like, for example. In addition, the material of the clip 10 may be resilient and/or electrically conducive.

Figure 5:
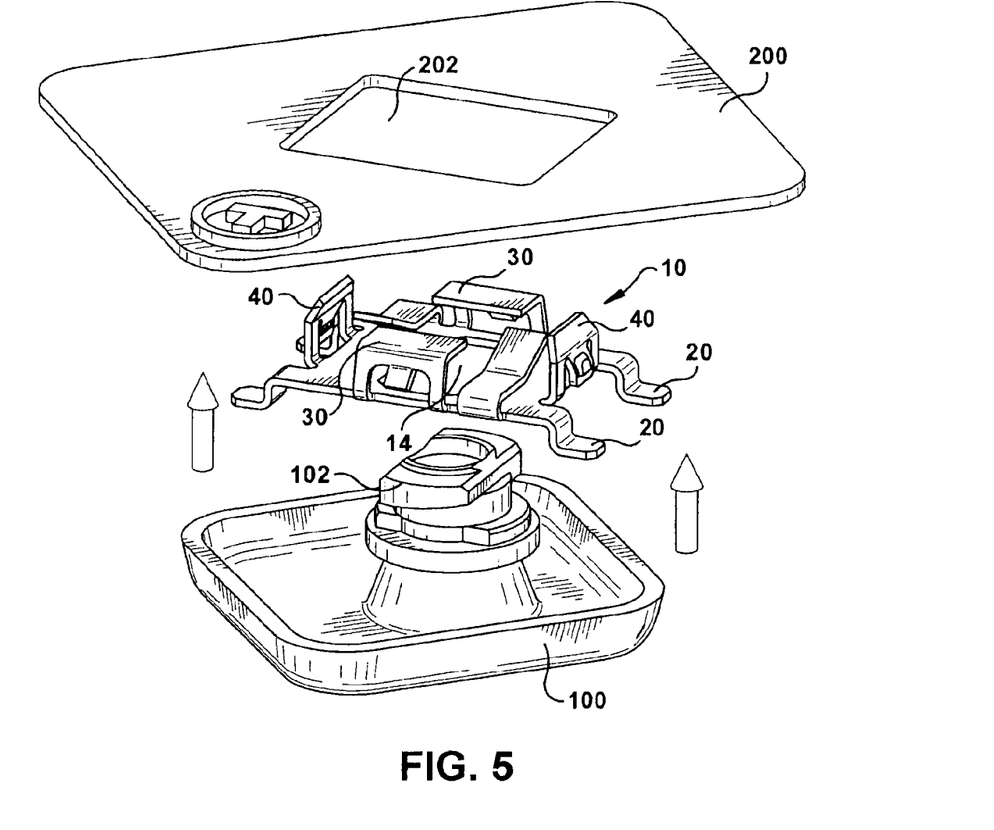
FIG. 5 illustrates the clip of FIG. 1 prior to installation in an embodiment of the present invention.

The clip 10 may combine the function of typical prior art fasteners into an easy to use and assemble one-piece component or one-piece stamping. This combination may eliminate the need for multiple components, as well as eliminates the need for any complicated assembly tools, which both result in cost savings, while also speeding up assembly time. As shown in FIG. 5, the clip 10 may be used with a first component 100 and a second component 200, for example.

Figure 2:
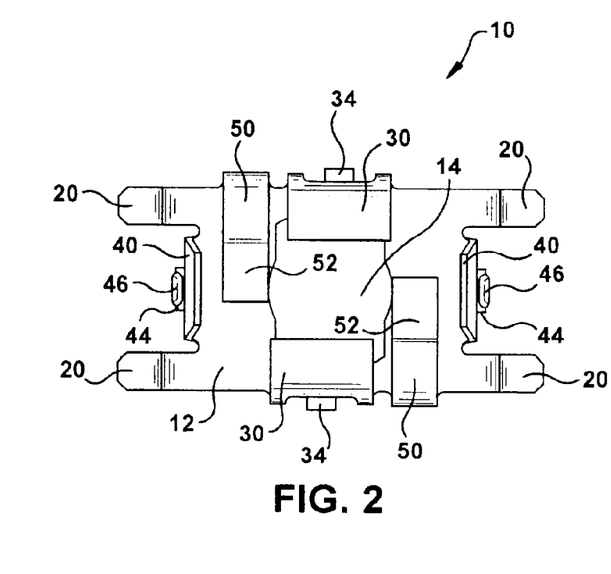
FIG. 2 illustrates a top view of the clip of FIG. 1.

As best seen in FIGS. 1 and 2, the trim clip 10 may be an approximate mirror image of itself along a horizontal center line, and may also be a substantial mirror image of itself along a vertical center line. The clip 10 may generally include a base plate 12, at least one leg 20, at least one flap 30, and at least one arm 40. The base plate 12 may be of any appropriate shape, size or thickness, such as a generally planar configuration and surface, for example. The length and width of the base plate 12 may correspond to the fastening portion of one of the components 100, 200.

With further reference to FIGS. 1 and 2, the base plate 12 may include an aperture 14. The aperture 14 may extend therethrough. The aperture 14 may be of any appropriate shape or size and should not be limited to those shown and described herein. In an embodiment, for example, the aperture 14 may be sized to receive a first component 100 therethrough.

The clip 10 may have one or more legs 20 extending from the base 12. The legs 20 may be of any appropriate shape or size, such as a general "S" shape, as shown in FIG. 1. In addition, the legs 20 may be positioned at any appropriate location on the base 12, such as being generally located at each corner of the base 12 of the clip 10. The legs 20 may also extend outward from each respective side of the base 12.

In an embodiment, for example, the clip 10 may have a pair of legs 20 located on each side of the clip 10, for a total of four legs 20. The pair of legs 20 on each side may be of a similar structure and may be a substantially mirror image of one another. It is to be understood, however, that the legs 20 may be of the same or of a different shape and structure and do not have to be a substantially mirror image of one another. Since the legs 20 are similar, the following description of the leg 20 will be understood to apply to all legs 20 for the clip 10.

The legs 20 may be integrally formed with the base 12. As an alternative, instead of being an integrally formed one piece clip 10, the base 12 and the legs 20 may be separate pieces that may be secured to one another by any appropriate means, including but not limited to welding, adhesive, mechanical fasteners, etc. and the like.

The legs 20 may be bent or angled away from the base plate 12. The legs 20 may be bendable and/or flexible to permit connection of the legs 20 within a fixture or component. The legs 20 may be made of any appropriate material, such as the same material as the base plate 12. The legs 20 may be sized and shaped to contact, slide on or within, to engage or secure to one of the components. For example, the legs 20 may fit or engage apertures or grooves in one of the components.

Figure 3:
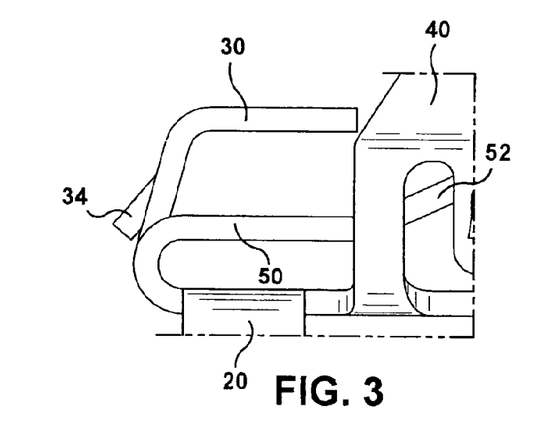
FIG. 3 illustrates a partial close up side view of the clip of FIG. 1.

As shown in FIGS. 1-3, one or more flaps 30 may extend from the base plate 12. In an embodiment, two flaps 30 may be utilized. The flaps 30 may be of any appropriate shape or size and may be positioned at any appropriate location on the base 12. In an embodiment, the flaps 30 may be located opposite one another toward the center of a side of the clip 10.

The pair of flaps 30 may be of a similar structure and may be a substantially mirror image of one another. It is to be understood, however, that the flaps 30 may be of the same or of a different shape and structure and do not have to be a substantially mirror image of one another. Since the flaps 30 are similar, the following description of the flap 30 will be understood to apply to both flaps 30 for the clip 10.

The flaps 30 may be integrally formed with the base 12. As an alternative, instead of being an integrally formed one piece clip 10, the base 12 and the pair of flaps 30 may be separate pieces that may be secured to one another by any appropriate means, including but not limited to welding, adhesive, mechanical fasteners, etc. and the like.

The flaps 30 may extend away from the base plate 12. In an embodiment, the flaps 30 may extend a first distance in a first direction substantially perpendicular to the base plate 12. The first distance may be substantially similar to the distance in which the first component should extend within the clip 10. To this end, the flaps 30 may act as a stop to prevent the first component from entering further into the clip 10.

The flaps 30 may extend a second distance in a second direction such that the flaps 30 fold over and have at least a portion that is generally parallel with the base plate 12. For example, the flaps 30 may extend inward with respect to the base plate 12. In such an embodiment, the flaps 30 may align with the edges of the aperture 14 of the base plate 12 or may have at least a portion that extends beyond the edge of the aperture 14 such that it is aligned a predetermined distance above the aperture 14. The flaps 30 may be sized and shaped to receive a first component 100.

The flaps 30 may have one or more apertures 32 that may be sized and shaped to receive a first component 100. The first component 100, for example, may have a stem 102, head portion or an enlarged end that may fit within or engage the apertures 32 of the flaps 30. The flaps 30 may be locked to the first component 100 to secure the first component 100 to the clip 10.

Figure 7:
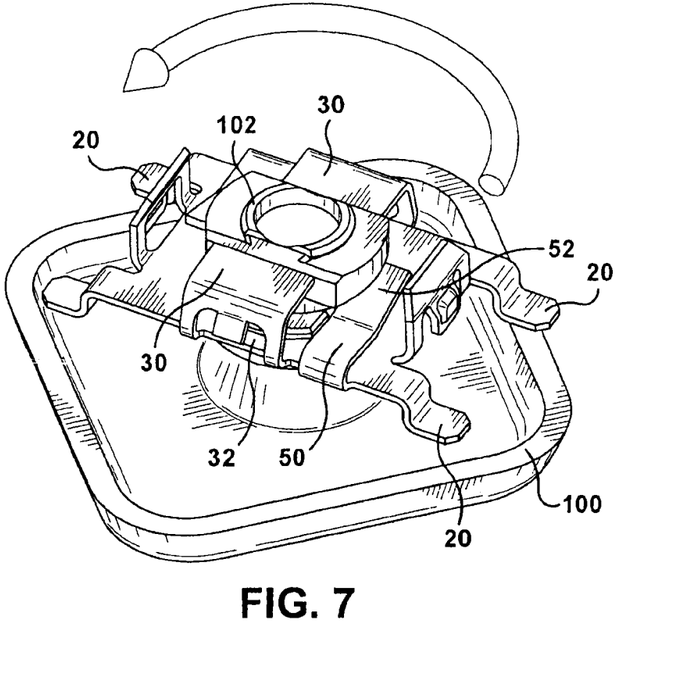
FIG. 7 illustrates the clip of FIG. 1 installed on a first component in an embodiment of the present invention.

In an embodiment, the apertures 32 may not engage the stem or head portion 102 of the first component 100 and may be sized and shaped to provide clearance for the tabs 34 of the flaps 30, which may engage a second component 200. The first component 100 or the clip 10 may be rotated with at least a portion of the first component 100 within the aperture 14 to secure the first component 100 to the clip 10. In a preferred embodiment, the clip 10 or the first component 100 may be rotated a quarter-turn to secure the first component 100 to the clip 10, as best shown in FIG. 7.

Figure 9:
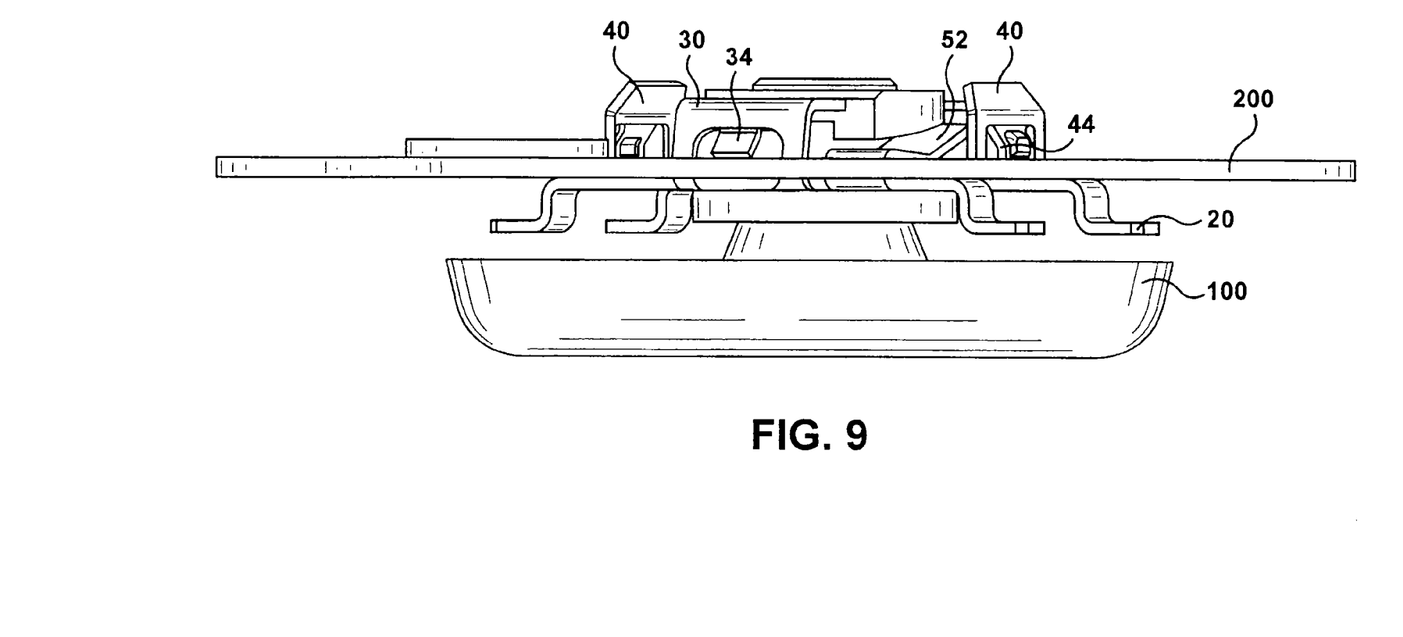
FIG. 9 illustrates a side view of the clip installed on the components of FIG. 8.
Figure 10:
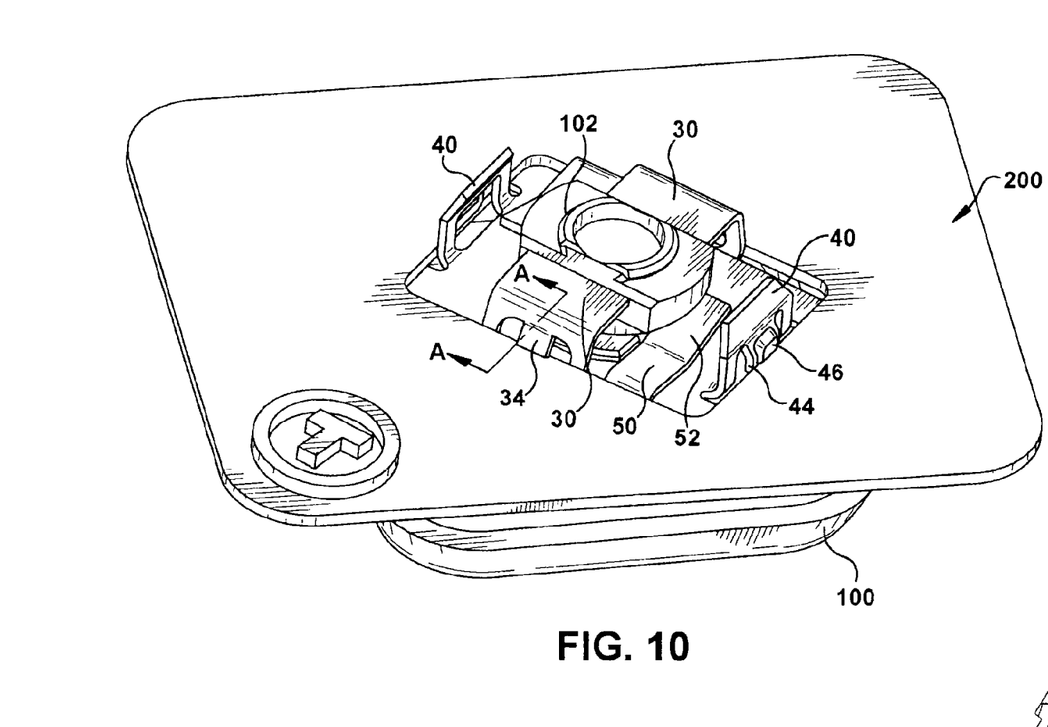
FIG. 10 illustrates a top perspective view of the clip installed on the components of FIG. 8.

With further reference to FIGS. 1 and 3, each flap 30 may include a tab 34. The tab 34 may be of any appropriate shape or size, such as a generally square or rectangular shape, for example. The tab 34 may be integrally connected to the flaps 30 at its free end. In addition, the tab 34 may be located at and extend from the approximate center of the free end of the flaps 30. While the tab 34 may be connected to and extend from the free end of the flap 30, the tab 34 is not connected to anything at its opposite end. This allows the free end of the tab 34 to stop at and catch onto a structure, such as the second component 200, as best shown in FIGS. 9 and 10. In addition, there may be spaces or apertures 32 located on either side of the tab 34, so that the apertures 32 may be located between the tab 34 and either side of the flap 30 to aid the tab 34 in catching onto a structure, such as the second component 200.

Figure 4:
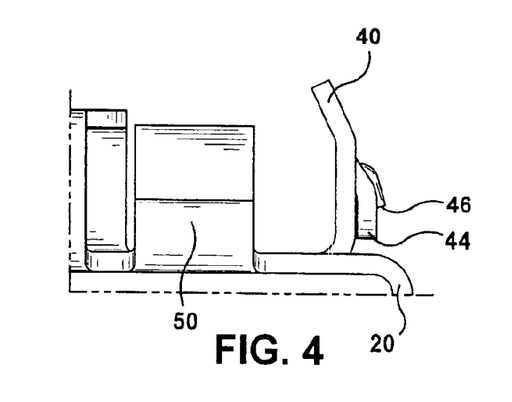
FIG. 4 illustrates partial close up front view of the clip of FIG. 1.

As shown in FIGS. 1, 2 and 4, one or more arms 40 may extend from or otherwise be connected to the base plate 12. In an embodiment, two arms 40 may be utilized. The arms 40 may be of any appropriate shape or size and may be positioned at any appropriate location on the base 12. In an embodiment, the arms 40 may be located opposite one another toward the center of a side of the clip 10, such as the opposite sides as where the flaps 30 may be located, as shown in FIG. 1.

The arms 40 may be sized and shaped to connect to a second component 200. The pair of arms 40 may be of a similar structure and may be a substantially mirror image of one another. It is to be understood, however, that the arms 40 may be of the same or of a different shape and structure and do not have to be a substantially mirror image of one another. Since the arms 40 are similar, the following description of the arm 40 will be understood to apply to both arms 40 for the clip 10.

The arms 40 may extend away from the base plate 12. In an embodiment, the arms 40 may extend a first distance in a first direction substantially perpendicular to the base plate 12. The arms 40 may extend a second distance in a second direction such that the arms 40 may slightly fold or bend over at an angle from the base plate 12. For example, the arms 40 may extend inward with respect to the base plate 12.

The arms 40 may be integrally formed with the base 12. As an alternative, instead of being an integrally formed one piece clip 10, the base 12 and the pair of arms 40 may be separate pieces that may be secured to one another by any appropriate means, including but not limited to welding, adhesive, mechanical fasteners, etc. and the like.

Each arm 40 may include a tab 44. The tab 44 may be of any appropriate shape or size, such as a generally square or rectangular shape, for example. The tab 44 may be integrally connected to the arms 40 at its free end. In addition, the tab 44 may be located at and extend from the approximate center of the free end of the arms 40. While the tab 44 may be connected to and extend from the free end of the arm 40, the tab 44 is not connected to anything at its opposite end. This allows the free end of the tab 44 to stop at and catch onto a structure, such as the second component 200, as best shown in FIGS. 9 and 10. In addition, there may be spaces or apertures 42 located on either side of the tab 44, so that the apertures 42 may be located between the tab 44 and either side of the arm 40 to aid the tab 44 in catching onto a structure, such as the second component 200, as discussed above.

With further reference to FIGS. 1, 2, and 4, each tab 44 may include a prong 46. The prong 46 may be of any appropriate shape or size, such as a smaller version of a corresponding shape and size of the tab 44, for example. The prongs 46 may act as an additional securing and retention feature of the clip 10.

As mentioned above, the tabs 34, 44 may secure or connect the clip 10 to the second component 200. The arms 40 may extend in a direction perpendicular to the base plate 12. The tabs 44 of the arms 40 may be biased in a first direction. Connecting the second component 200 to the tabs 34, 44 may move the tabs 34, 44 in a second direction opposite the first direction.

As best shown in FIGS. 1 and 2, at least one wing 50 may extend from the base plate 12. In an embodiment, there may be two wings 50. For example, the pair of wings 50 may extend inward toward the center of the clip 10, such as toward the aperture 12. The wings 50 may be folded or bent over to be generally adjacent to the aperture 14 in the base plate 12.

Each wing 50 may include a ramped surface 52. The ramped surface 52 may be capable of engaging a portion of the first component 100. The wings 50 may be integrally formed with the base plate 12, or may be separate piece that may be affixed to the base plate 12 by any appropriate means, including, but not limited to, fasteners, adhesive, welding, and the like.

In addition, the wings 50 may be positioned at any appropriate location on the clip 10. For example, the wings 50 may be located on opposite sides and opposite corners of the base plate 12, as shown in FIGS. 1 and 2. For example, the wings 50 may be located to the same side, such as the right side as viewed in FIGS. 1 and 2, of the flaps 30.

FIGS. 5-10 illustrate an example of a first component 100 and a second component 200 that may be attached by the clip 10. While the clip 10 may be shown and described as connecting to the first component 100 and the second component 200 shown in FIGS. 5-10, the clip 10 may be attached to any of various types of components, including, but not limited to, valve stems, sun visors, hanger hooks, grab handles, or other components, as will be appreciated by one of ordinary skill in the art.

Figure 6:
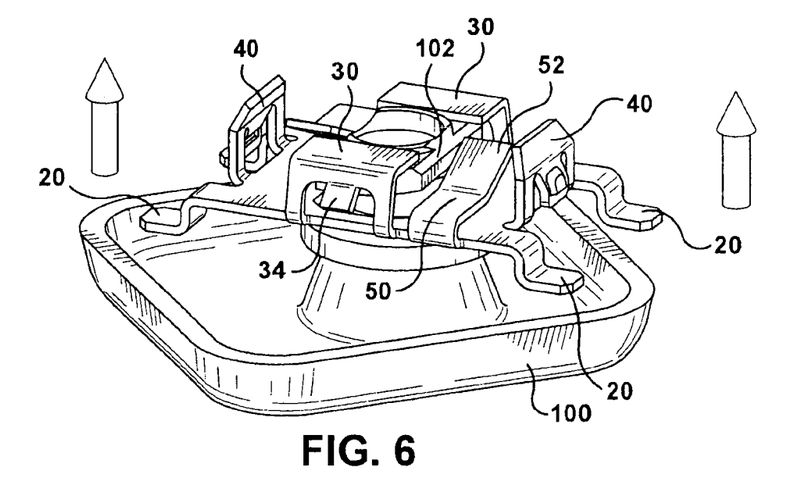
FIG. 6 illustrates the clip of FIG. 1 positioned on a first component in an embodiment of the present invention.

The first component 100 may have a stem 102 extending from the base of the component 100, as best shown in FIG. 5. The aperture 14 of the clip 10 may be sized and shaped to receive the stem 102 of the first component 100. The stem 102 may, for example, be inserted into the aperture 14 of the clip 10. FIG. 6 illustrates an embodiment of the clip 10 connected to the first component 100 prior to rotation. As shown, the stem 102 may be inserted into the clip 10 and may contact the flaps 30 to prevent further insertion of the stem 102 into the clip 10.

As illustrated in FIGS. 6 and 7, the first component 100 and/or the clip 10 may be rotated to secure the clip 10 and the first component 100 together. In an embodiment, the clip 10 may be rotated a quarter-turn to secure the clip 10 to the component 100. Rotation of the clip 10 and/or the component 100 may cause the stem 102 to engage the wing 50. For example, rotation of the clip 10 may cause the stem 102 to engage the wing 50 thereby depressing the wing 50, such as by depressing the ramped surface 52 of the wing 50. The wings 50 may therefore apply a force onto the stem 102 to force or otherwise bias the stem 102 toward or against the flaps 30. To this end, the stem 102 may be securely affixed to the clip 10 by, for example, locking or otherwise securing to the flaps 30.

Figure 8:
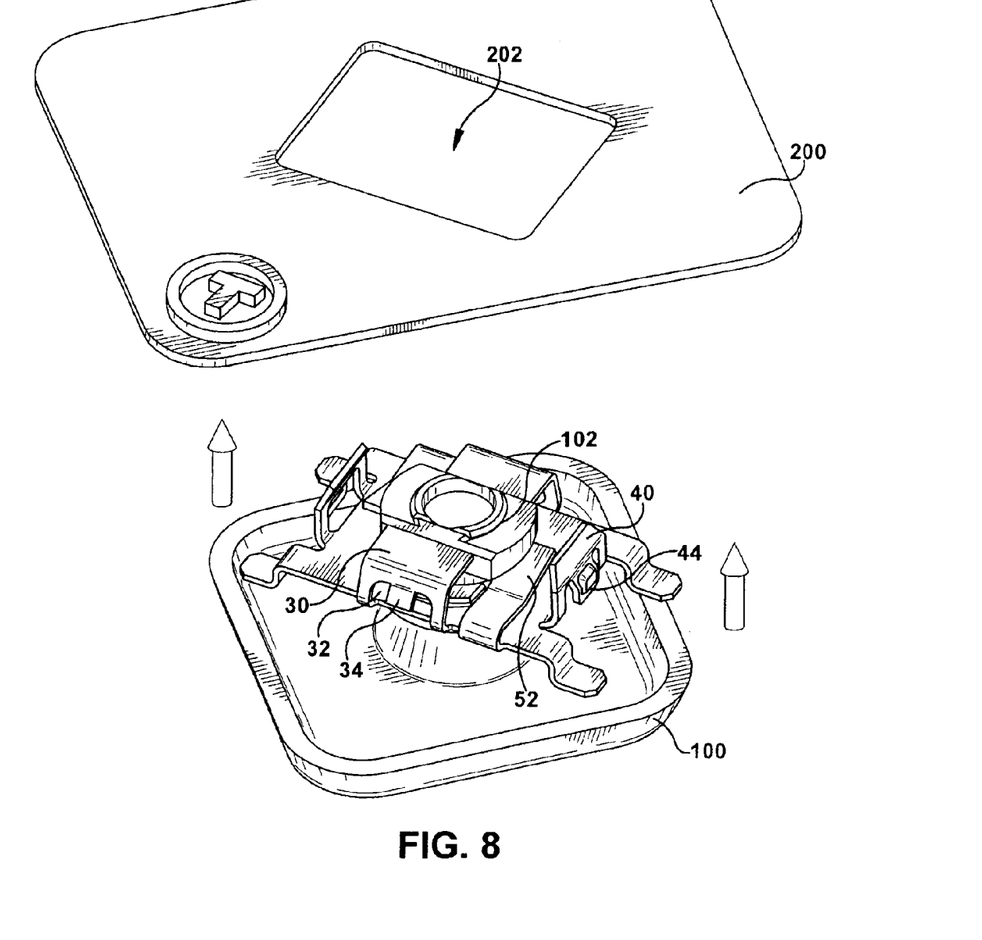
FIG. 8 illustrates the clip of FIG. 1 installed on a first component and prior to installation on a second component in an embodiment of the present invention.

FIGS. 8-10 illustrate attaching the second component 200 to the clip 10. The component 200 may have an aperture 202. The aperture 202 may be of any appropriate shape or size, such as being sized and shaped to align with the arms 40 and/or the flaps 30. For example, the aperture 202 may be sized such that it is alignable with the exterior sides of the arms 40.

Figure 11:
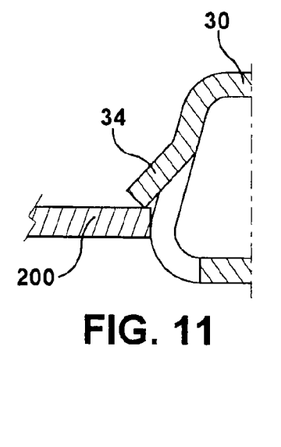
FIG. 11 illustrates a partial cross-sectional view taken generally along section line A-A of the clip of FIG. 10 attached to a second component in an embodiment of the present invention.

In an embodiment, the arms 40 may be spaced to correspond to the size of the aperture 202 of the second component 200. The aperture 202 may be positioned on the tabs 44 such that the exterior edge of the aperture 202 may contact the tabs 44 of the arms 40. FIG. 11 illustrates a partial cross-sectional view of the clip 10 engaged with the second component 200. The second component 200 may snap into or otherwise attach to the tabs 44 of the arms 40, as best shown in FIGS. 9 and 10. In addition, there may be a low insertion force as the clip 10 is inserted into the aperture 202 of the second component 200, while maintaining a high retention force via the tabs 34, 44, for example.

FIG. 10 illustrates an embodiment of the clip 10 attached to the first component 100 and the second component 200. The second component 200 may be attached to the clip 10 such that the second component 200 may be positioned between the tabs 34, 44 and the first component 100. As shown in FIGS. 9 and 10, the clip 10 may be easily serviceable by rotation of the first component 100 and/or the clip 10 to separate the clip 10 from the first component 100.

In an embodiment, the clip 10 and/or the first component 100 may be rotated in a second direction to remove the clip 10 which may be opposite to a first direction to attach the clip 10 to the first component 100. In a preferred embodiment, the clip 10 and/or the first component 100 may be rotated a quarter turn to attach the clip 10 to the first component 100. In such an embodiment, the clip 10 and/or the first component 100 may be rotated a quarter turn in the opposite direction to separate the clip 10 from the first component 100. The first component 100 may then be re-installed by being rotated a quarter turn in the opposite direction.

In an embodiment, no tools may be required for initial installation of the clip 10 into the components 100, 200 or for servicing the clip 10 due to its quarter turn serviceability, as discussed above. In addition, there would be no visible fasteners, such as screws or the like, with this clip 10 thereby providing for an improved aesthetic appeal. Moreover, the customer would not need to design an extra piece to cover any exposed fasteners, such as screws, for example.

The invention has been described above and, obviously, modifications and alternations will occur to others upon a reading and understanding of this specification. The claims as follows is intended to include all modifications and alterations insofar as they come within the scope of the claim or the equivalents thereof.

Having thus described the invention, we claim:

1. A clip for connecting a first component having a stem and a second component, said clip comprising:
   a base having a planar configuration and a periphery, wherein said base includes an aperture capable of receiving the stem;
   a pair of mutually confronting flaps extending upward from said base, said flaps including end portions extending inward such that said end portions are positioned directly above said aperture, wherein each flap includes a tab extending at an angle from said flap away from said periphery of said base and is engageable with the stem upon extension through said aperture;
   a pair of mutually confronting arms extending outwardly from said base and angled inward from said periphery, wherein each arm comprises a tab extending at an angle from said arm, wherein said tabs of said arms engage said arm with the second component upon insertion of said arms through the second component; and
   at least one wing extending from said base, said at least one wing having a ramped surface extending directly above said base and configured to apply a force onto the first component to bias the first component toward or against said flaps upon insertion of the first component through said aperture.

2. The clip of claim 1, wherein said base, said arms, said flaps, and said at least one wing are integrally formed as one piece.

3. The clip of claim 2 further comprising at least one leg located on and extending from said base.

4. The clip of claim 2, further comprising the first component inserted into said aperture and configured to rotate relative to said aperture to secure said clip and the first component together.

5. The clip of claim 4, wherein the first component is capable of being rotated a quarter turn to secure said clip and the first component together.

6. The clip of claim 4, wherein said tabs of said flaps engage said arm with the second component upon insertion of said arms through the second component.

7. A clip for connecting a first component having a stem and a second component, said clip comprising:
   a base having a generally planar configuration, an aperture and a periphery, wherein said aperture is configured to have inserted therein the stem;
   a pair of mutually confronting flaps extending upward from said base at least a portion of which is angled inward from said periphery, said flaps including end portions extending inward such that said end portions are positioned directly above said aperture wherein said flaps are capable of securing the stem;
   a tab extending at an angle from each of said flaps away from said periphery of said base;
   a pair of mutually confronting arms extending from said base and angled inward from said periphery,
   an arm tab extending at an angle from each of said arms away from said periphery of said base, wherein said arm tabs are capable of securely engaging said arm with the second component; and
   at least one wing extending from said base, said at least one wing having a ramped surface extending directly above said base and configured to apply a force onto the first component to bias the first component toward or against said flaps upon insertion of the first component through said aperture.

8. The clip of claim 7, wherein the tabs are capable of engaging the second component.

9. The clip of claim 7, wherein said base, said arms, said flaps, and said at least one wing are integrally formed as one piece.

10. The clip of claim 7, further comprising at least one leg located on and extending from said base.

11. The clip of claim 7, further comprising at least one prong attached to said arm tabs, wherein said at least one prong is capable of engaging the second component.

12. A clip assembly comprising:
   a first component having a stem;
   a second component;
   a base having a generally planar configuration and a periphery, said base including an aperture through which said stem is inserted;
   a pair of mutually confronting flaps extending from said base, and angled inward from said periphery, wherein said flaps include end portions positioned directly above said aperture;
   a pair of mutually confronting arms extending outwardly from said base and angled inward from said periphery,
   an arm tab extending at an angle from each of said arms and away from said periphery of said base, wherein said arm tabs engage said arm with said second component; and
   a pair of wings extending from said base and angled inward from said periphery, wherein inserting said stem through said aperture and rotating said stem engages said flaps with said stem causing said wings to apply a force to said stem biasing said stem toward said flaps.

13. The clip of claim 12 further comprising a tab extending at an angle from each of said flaps away from said periphery of said base wherein said tab engages said second component.

14. The clip of claim 12, wherein said stem is rotatable approximately 90 degrees in a first direction to secure said stem to said flaps.

15. The clip of claim 14, wherein said stem is rotatable in a second direction to unsecure said stem from said flaps, wherein said first direction is different from said second direction.

* * * * *